(12) United States Patent
Inoue et al.

(10) Patent No.: US 12,332,044 B2
(45) Date of Patent: Jun. 17, 2025

(54) DETECTION DEVICE, CORRECTION DEVICE, PROCESSING DEVICE, AND ARTICLE MANUFACTURING METHOD

(71) Applicant: CANON KABUSHIKI KAISHA, Tokyo (JP)

(72) Inventors: Yukihiro Inoue, Tochigi (JP); Hiroyuki Morimoto, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 262 days.

(21) Appl. No.: 17/969,747

(22) Filed: Oct. 20, 2022

(65) Prior Publication Data

US 2023/0133411 A1   May 4, 2023

(30) Foreign Application Priority Data

Nov. 1, 2021   (JP) .................................. 2021-178766

(51) Int. Cl.
*G01B 11/26* (2006.01)
*H01S 3/00* (2006.01)
*H01S 3/139* (2006.01)

(52) U.S. Cl.
CPC ............ *G01B 11/26* (2013.01); *H01S 3/0071* (2013.01); *H01S 3/139* (2013.01)

(58) Field of Classification Search
CPC ....... G01B 11/26; H01S 3/0071; H01S 3/139; G02F 2203/24; G02B 26/0816; G02B 27/106
See application file for complete search history.

(56) References Cited

U.S. PATENT DOCUMENTS

| | | | | |
|---|---|---|---|---|
| 5,307,210 A | * | 4/1994 | MacFarlane | ....... G02B 19/0033 359/857 |
| 6,014,206 A | | 1/2000 | Basting et al. | |
| 9,851,574 B2 | * | 12/2017 | Bromer | .............. G02B 26/0816 |
| 2014/0210996 A1 | * | 7/2014 | Rueb | ....................... G06T 7/292 348/95 |
| 2021/0060698 A1 | * | 3/2021 | Inoue | ................... G02B 7/1821 |

(Continued)

FOREIGN PATENT DOCUMENTS

| | | | | |
|---|---|---|---|---|
| CN | 117615874 A | * | 2/2024 | ......... B23K 26/0643 |
| EP | 4328672 A1 | * | 2/2024 | ......... G02B 26/0816 |

(Continued)

*Primary Examiner* — Abdullahi Nur
(74) *Attorney, Agent, or Firm* — Carter, DeLuca & Farrell LLP (57) ABSTRACT

Provided is a detection device which is able to accurately detect position information on an optical axis of laser light and reduce a measurement error, including a first split unit configured to split laser light output from a light source into a plurality of light beams, a detection unit configured to detect a position of each of the plurality of light beams, a light guide unit configured to guide the plurality of split light beams to the detection unit with optical path lengths different from each other, and a control unit configured to calculate an angular deviation or a positional deviation of the laser light on the basis of a difference in the position of each of the plurality of light beams detected by the detection unit, wherein the detection unit is one sensor that detects the position of each of the plurality of light beams guided by the light guide unit.

12 Claims, 8 Drawing Sheets

(56) References Cited

U.S. PATENT DOCUMENTS

| | | | | |
|---|---|---|---|---|
| 2021/0157000 A1* | 5/2021 | Imaki | ............... | G01S 17/58 |
| 2022/0334400 A1* | 10/2022 | Ott | ............... | G02B 27/0944 |
| 2023/0012623 A1* | 1/2023 | Zhou | ............... | H01S 5/405 |
| 2024/0004203 A1* | 1/2024 | Ikuta | ............ | G02B 26/0816 |

FOREIGN PATENT DOCUMENTS

| | | |
|---|---|---|
| JP | H04-351282 A | 12/1992 |
| JP | 2000-114636 A | 4/2000 |

* cited by examiner

DETECTION DEVICE, CORRECTION DEVICE, PROCESSING DEVICE, AND ARTICLE MANUFACTURING METHOD

BACKGROUND OF THE INVENTION

Field of the Invention

The present invention relates to a detection device, a correction device, a processing device, and an article manufacturing method.

Description of the Related Art

There is a technique of correcting the optical axis of laser light emitted from a laser light source. As such a method of adjusting the laser optical axis, Japanese Patent Laid-Open No. H4-351282 discloses providing two movable mirrors and two sensors on the optical axis, calculating the amount of driving of the two movable mirrors from information on positional deviation of the detected laser light, and realizing the correction of optical axis deviation of the laser light by moving the laser light a predetermined amount.

In Japanese Patent Laid-Open No. H4-351282, laser light emitted from a laser oscillator is reflected by two mirrors disposed on the optical axis. Each of the mirrors is provided with two pairs of rotation mechanisms and two sets of actuators, and can be adjusted to a desired angle with a two-axis degree of freedom. A portion of the laser light that has passed through the mirrors is received by two sensors, and the two-dimensional position of the laser light is detected.

This detection value is input to an arithmetic control device connected to the actuator, and the operation of the actuator is controlled to adjust the angles of the two mirrors, thereby correcting the optical axis position and angle of the laser light.

However, in Japanese Patent Laid-Open No. H4-351282, position information cannot be accurately detected due to variations in the sensitivity of the two sensors. In addition, if a positional relationship (distance) between the two sensors changes due to thermal effects or the like, a measurement error occurs. In addition, in Japanese Patent Laid-Open No. 2000-114636, laser light is split into two light beams and guided to a detection unit with different optical path lengths, and the angle of the laser light is obtained from the position of one split light beam, and the position of the laser light is obtained from the position of the other light beam, but a measurement error may occur even with this method.

Consequently, an object of the present invention is to provide an optical axis detection device and an optical axis correction device that make it possible to accurately detect position information on the optical axis of laser light and reduce a measurement error.

SUMMARY OF THE INVENTION

In order to solve the above problem, according to an aspect of the present invention, there is provided a detection device including:
a first split unit configured to split laser light output from a light source into a plurality of light beams;
a detection unit configured to detect a position of each of the plurality of light beams;
a light guide unit configured to guide the plurality of split light beams to the detection unit with optical path lengths different from each other; and
at least one processor or circuit configured to function as:
a control unit configured to calculate an angular deviation or a positional deviation of the laser light on the basis of a difference in the position of each of the plurality of light beams detected by the detection unit,
wherein the detection unit is one sensor that detects the position of each of the plurality of light beams guided by the light guide unit.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
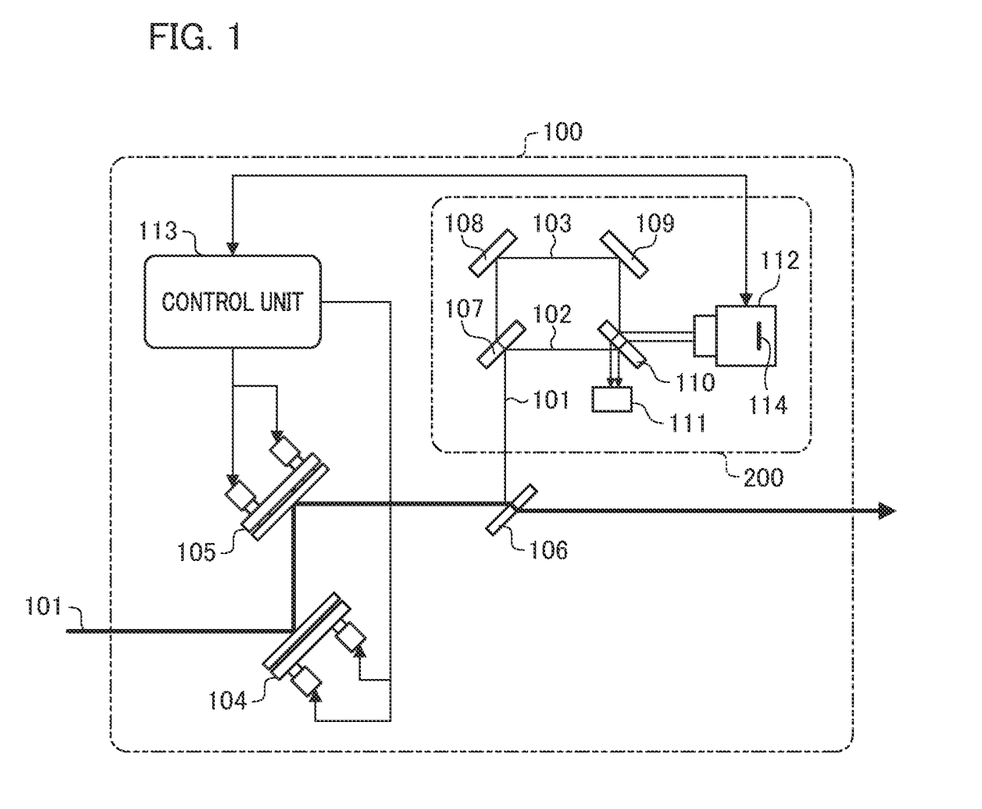
FIG. 1 is a diagram illustrating a configuration example of an optical axis correction unit according to a first embodiment.

FIG. 1 is a diagram illustrating a configuration example of an optical axis correction unit 100 according to a first embodiment. The optical axis correction unit 100 is an optical axis correction device that corrects the optical axis position of a laser light beam 101 output from a laser light source such as a laser oscillator or its angle of incidence on a processing target. The optical axis correction unit 100 includes a first actuator mirror 104, a second actuator mirror 105, a sampler 106, a control unit 113, and a measurement unit 200.

The laser light beam 101 which is output from a light source and incident on the optical axis correction unit 100 is first reflected by two light reflection members, that is, the first actuator mirror 104 and the second actuator mirror 105. The first actuator mirror 104 and the second actuator mirror 105 can be adjusted to a desired angle with a two-axis degree of freedom by two pairs of rotation mechanisms and two sets of actuators.

The laser light beam 101 reflected by the first actuator mirror 104 and the second actuator mirror 105 is then branched in two directions by the sampler 106 that branches (splits) the light at a desired ratio. Most of the laser light beam 101 incident on the optical axis correction unit 100 passes through the sampler 106 and is emitted from the optical axis correction unit 100, while a portion thereof is reflected by the sampler 106 and sent out to the measurement unit 200.

The measurement unit 200 includes a first half mirror 107 (first split unit), a first mirror 108, a second mirror 109, a second half mirror 110 (second split unit), a damper 111, and a camera 112 (detection unit).

A portion of the laser light beam 101 incident on the measurement unit 200 is first branched in two directions, an optical path A102 and an optical path B103, by the first half mirror 107 that branches (splits) the light at a desired ratio. The second half mirror 110 that likewise branches the light at a desired ratio is disposed on the optical path A102. A portion of the laser light on the optical path A102 passes through the second half mirror 110 and is incident on the camera 112. The first mirror 108 and the second mirror 109 are disposed on the optical path B103.

The laser light of the optical path B103 is reflected by the first mirror 108 and the second mirror 109, and then a portion thereof is reflected by the second half mirror 110 and incident on the camera 112. The first mirror 108 and the second mirror 109 are disposed on the optical path B103, so that the optical path length of the optical path B103 becomes longer than the optical path length of the optical path A102, and the optical path lengths of the optical path A102 and the optical path B103 are different from each other. That is, the first mirror 108 and the second mirror 109 are optical members for making the optical path lengths of a plurality of light beams split by the first half mirror 107 different from each other.

The second half mirror 110 guides transmitted light on the optical path A102 and reflected light on the optical path B103 to different positions on the light receiving surface of a sensor 114 of the camera 112 to be described later. Here, the different positions on the light receiving surface of the sensor 114 are positions at which light beams do not overlap each other on the light receiving surface of one sensor within the camera 112 (one sensor formed on the same semiconductor substrate).

The reflected light on the optical path A102 and the transmitted light on the optical path B103 which are caused by the second half mirror 110 are shielded and absorbed by the light-absorbing damper 111. In the first embodiment, the first mirror 108, the second mirror 109, and the second half mirror 110 are light guide units that guide a plurality of split light beams to the camera 112 with different optical path lengths.

Meanwhile, if the amount of light branched by the sampler 106 is weak enough, and the amount of light from the optical path A102 and the amount of light from the optical path B103 are weak enough not to damage the sensor 114, there is no need to allow a portion of the light to escape to the damper 111 through the second half mirror 110. In this case, for example, either the light from the optical path A102 or the light from the optical path B103 may be reflected by a reflection member and guided to a different position on the light receiving surface of the sensor 114.

In this way, the optical path lengths of the optical path A102 and the optical path B103 are set to be different from each other. In FIG. 1, the optical path length of the optical path B103 is longer than that of the optical path A102, but it may be reversed. In addition, the first actuator mirror 104 and the second actuator mirror 105 need not be formed in an integrated structure. For example, it is also possible to use a driving mechanism such as a single-axis motor and a positioning mechanism combining three axes of X, Y, and Z and an angle $\theta$ of a reflection member such as a mirror that reflects laser light.

The camera 112 is provided with one sensor 114, which measures the incidence positions of two laser light beams from the optical path A102 and the optical path B103, that is, the optical axis positions on the light receiving surface of the sensor 114, and transmits the measurement result to the control unit 113 serving as a control unit. The sensor 114 is, for example, a charge coupled device (CCD) sensor or a complementary metal oxide semiconductor (CMOS) sensor.

The control unit 113 has a CPU (computer) and a memory (ROM, RAM) which are not shown, the CPU controlling each functional block of the optical axis correction unit 100 and performing arithmetic operations necessary therefor in accordance with a computer program loaded from the memory. Specifically, in addition to control of the camera 112, the optical axis correction unit 100 has a fluctuation component calculation function for the measurement result of the camera 112 and an actuator control function, and controls the angle of the actuator mirror.

Figure 2:
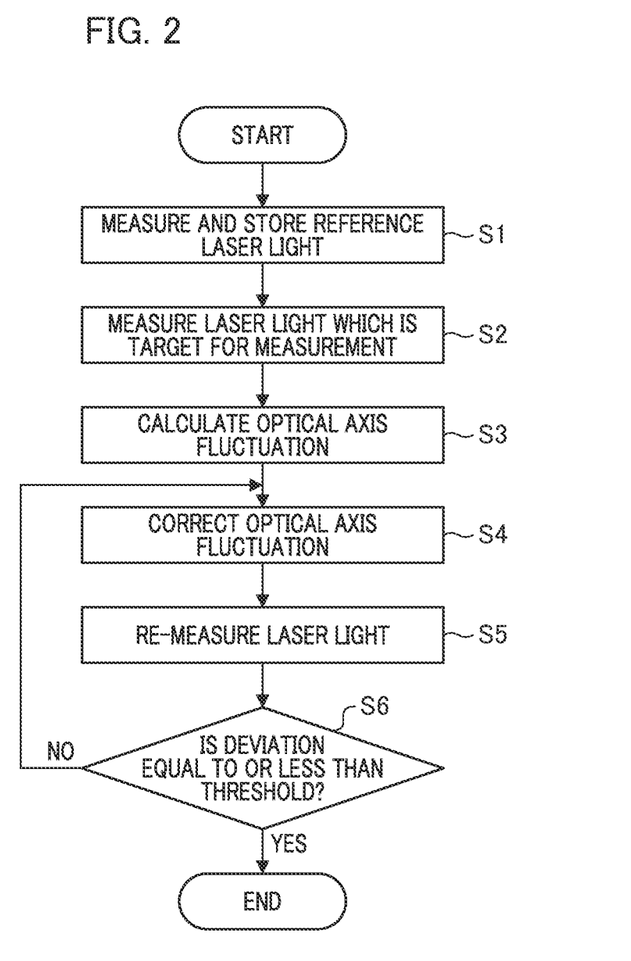
FIG. 2 is a flow diagram of a correction process for optical axis fluctuation according to the first embodiment.

A series of steps relating to a correction process for optical axis fluctuation in the first embodiment will be described below. FIG. 2 is a flow diagram of a correction process for optical axis fluctuation according to the first embodiment. Each operation (step) shown in this flowchart can be executed by control of each unit performed by the control unit 113.

In step S1, laser light serving as a reference (reference laser light) is first measured and stored. Specifically, the reference laser light is caused to be incident on the optical axis correction unit 100, and two incidence positions of the laser light beams from the optical path A102 and the optical path B103 on the sensor 114 are measured and stored as reference positions (also referred to as reference incidence positions).

In step S2, the incidence position of laser light which is a target for measurement is measured. Specifically, laser light which is a target for measurement is caused to be incident on the optical axis correction unit 100, and two incidence positions of the laser light beams from the optical path A102 and the optical path B103 on the sensor 114 are measured.

In step S3, optical axis fluctuation from the reference laser light is calculated. The incidence positions of the two light beams from the optical path A102 and the optical path B103 on the sensor 114 change in accordance with a change in the position or angle of the laser light which is a target for measurement incident on the optical axis correction unit 100. Therefore, the camera 112 calculates a deviation from the reference position, that is, the amount of change from the reference position, from the measurement result in step S2.

Specifically, the control unit 113 calculates the deviation amount and deviation direction of the optical axis position of each of a plurality of light beams from the reference position on which the reference laser light is incident. The angle component of the optical axis fluctuation (the amount of change in angle) and the position component of the optical axis fluctuation (the amount of change in optical axis position) are calculated on the basis of the calculated deviation amount and deviation direction. The details of this step will be described later.

In step S4, the optical axis fluctuation of the laser light is corrected. The control unit 113 calculates the angle of the actuator mirror that can resolve the optical axis fluctuation on the basis of the deviation calculated in step S3, and drives the actuator mirror.

In step S5, the camera 112 re-measures the incidence position of the laser light with the sensor 114. Specifically, after correction, that is, after the actuator mirror is driven, the incidence positions of the two light beams from the optical path A102 and the optical path B103 are measured. In step S6, it is determined that that the corrected incidence position of the laser light matches the stored reference position with desired accuracy.

Specifically, it is determined whether the deviation between the corrected incidence position of the laser light and the reference position is equal to or less than a threshold. In step S6, if the deviation is equal to or less than the threshold (Yes), the process ends. On the other hand, if the deviation is not equal to or less than the threshold (No), steps S3 to S6 are repeated until the deviation becomes equal to or less than the threshold.

Through the series of steps described above, it is possible to correct the optical axis fluctuation of the laser light, and to stabilize the position of the optical axis of the laser light emitted from the optical axis correction unit 100 and the angle of incidence on the processing target with respect to the fluctuation of the laser light incident on the optical axis correction unit 100.

Figure 3A:
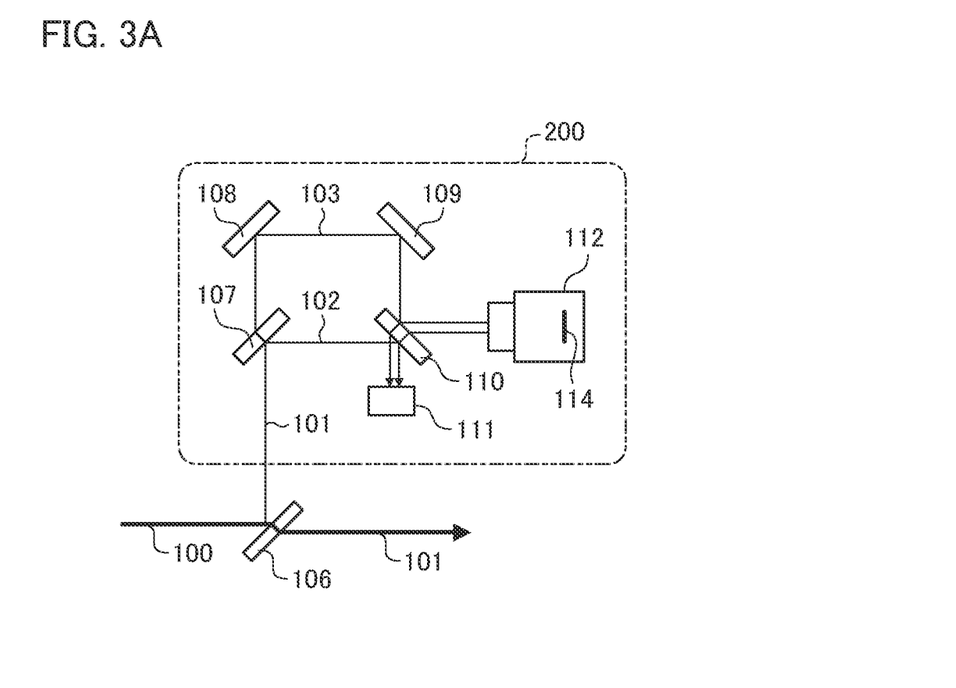
FIGS. 3A and 3B are diagrams illustrating the correction process for optical axis fluctuation according to the first embodiment.
Figure 3B:
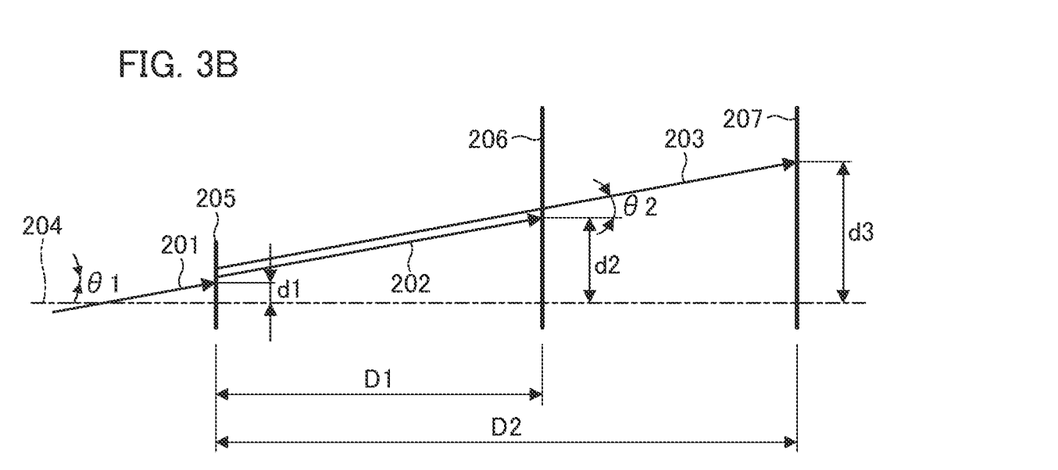

FIGS. 3A and 3B are diagrams illustrating a correction process for optical axis fluctuation according to the first embodiment. FIG. 3A is a diagram partially illustrating the measurement unit 200 in FIG. 1, and FIG. 3B is an explanatory diagram of the principle of measurement using the camera 112.

In FIG. 3B, a reference optical axis 204 is an optical axis of laser light stored as a reference. An optical axis 201 to be measured is an optical axis in a state where the position and angle of laser light incident on the optical axis correction unit are fluctuated, that is, an optical axis of laser light which is a target for measurement. A sampler surface 205 is a surface that simulates the reflection surface of the sampler 106 in FIG. 3A along the optical axis.

An angular deviation θ1 and a positional deviation d1 are fluctuation components of the optical axis 201 to be measured on the sampler surface 205 from the reference optical axis 204. A first sensor light receiving surface 206 is a surface that simulates the light receiving surface of the sensor 114 through the optical path A102 in FIG. 3A. A second sensor light receiving surface 207 is a surface schematically illustrating the light receiving surface of the sensor 114 through the optical path B103 in FIG. 3A.

D1 is a design distance from the light receiving surface of the sampler 106 to the first sensor light receiving surface 206, and is equivalent to the design optical path length of the optical path A102 in FIG. 3A. D2 is a design distance from the light receiving surface of the sampler 106 to the second sensor light receiving surface 207, and is equivalent to the design optical path length of the optical path B103 in FIG. 3A.

An optical path 202 simulates the optical path of laser light in the optical path A102 after fluctuation. An optical path 203 simulates the optical path of laser light in the optical path B103 after fluctuation. In FIG. 3A, the light receiving surface of the sensor 114 (sensor light receiving surface) for measuring the light beams on the optical path A102 and the optical path B103 is the same, but in FIG. 3B, it is simulatively set as two sensor light receiving surfaces corresponding to D1 and D2 from the sampler surface 205. Therefore, a difference in optical path length between the optical path A102 and the optical path B103 in FIG. 3A is a difference between D2 and D1 in FIG. 3B.

Here, d2 is the amount of incident point movement on the first sensor light receiving surface 206 after optical axis fluctuation, that is, the amount of incident point movement of the optical axis 201 to be measured on the first sensor light receiving surface 206 from the reference optical axis 204. In addition, d2 simulates a change in the incidence position of light from the optical path A102 to the sensor 114 in FIG. 3A.

Similarly, d3 is the amount of incident point movement on the second sensor light receiving surface 207 after optical axis fluctuation, that is, the amount of incident point movement of the optical axis 201 to be measured on the second sensor light receiving surface 207 from the reference optical axis 204. In addition, d3 simulates a change in the incidence position of light from the optical path B103 to the sensor 114 in FIG. 3A.

An angular deviation θ2 is an angle fluctuation component of laser light within the measurement unit 200, and is coincident with the angular deviation θ1 in principle.

Figure 4:
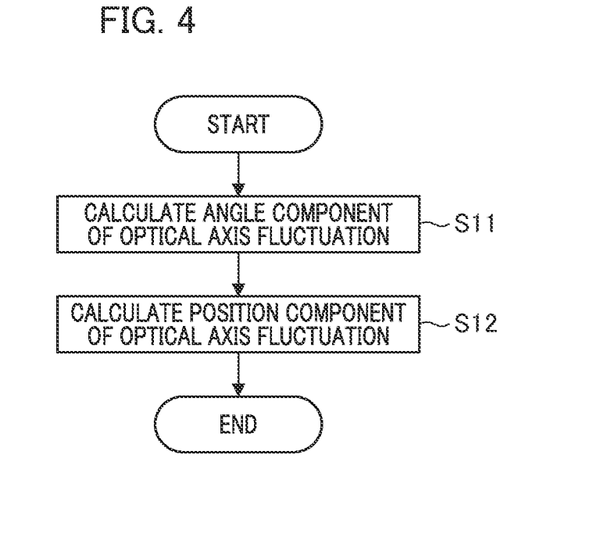
FIG. 4 is a flow diagram of a calculation process for optical axis fluctuation.

A series of steps relating to a method of calculating optical axis fluctuation, that is, detailed steps of step S3 in FIG. 2, will be described below. FIG. 4 is a flow diagram of a calculation process for optical axis fluctuation. Each operation (step) shown in this flowchart can be executed by the control unit 113. In step S11, the angle component of optical axis fluctuation is calculated on the basis of the measurement result in the camera 112, specifically, the deviation amount and deviation direction of the optical axis position calculated on the basis of the measurement result in step S2 of FIG. 2.

In addition, θ2 in FIG. 3B is represented by $\mathrm{atan}((d3-d2)/(D2-D1))$. Since θ2 is coincident with θ1 in principle, the angular deviation θ1 of optical axis fluctuation can be calculated by this formula.

In step S12, the position component of optical axis fluctuation is calculated on the basis of the measurement result in the camera 112, specifically, the deviation amount and deviation direction of the optical axis position calculated on the basis of the measurement result in step S2 of FIG. 2. In addition, d1 in FIG. 3B is represented by $d2-D1 \times \tan(\theta2)$. The positional deviation d1 which is the position component of optical axis fluctuation can be calculated by this formula.

Through the series of steps described above, the angle component and position component of optical axis fluctuation can be calculated from the measurement result in the camera 112. Meanwhile, by inserting an optical system of which the optical magnification is changed by a combination of lenses and the like into the optical path of the measurement unit 200, the relative efficiency of the angle component and the position component may be changed. For example, in an optical system with a magnification of 2, the angle component of the emitted laser light changes by a factor of ½ and the position component thereof changes by a factor of 2 with respect to the fluctuation of the incident laser light.

In the first embodiment, although the laser light incident on the optical axis correction unit 100 is branched into the two optical paths A102 and B103 having different optical path lengths, it may be branched into a plurality of optical paths having different optical path lengths, and the number of branches is not limited to two. If the number of branches is increased, the accuracy of the calculated fluctuation component increases.

In addition, the light from the optical path A102 and the light from the optical path B103 may be guided to the light receiving surface of the sensor 114 so that at least some of them overlap each other. In this case, for example, by varying the timing of detecting the optical axis with the sensor 114 using a shutter or the like, the optical axis positions of the light from the optical path A102 and the light from the optical path B103 can be measured by one sensor.

Figure 5:
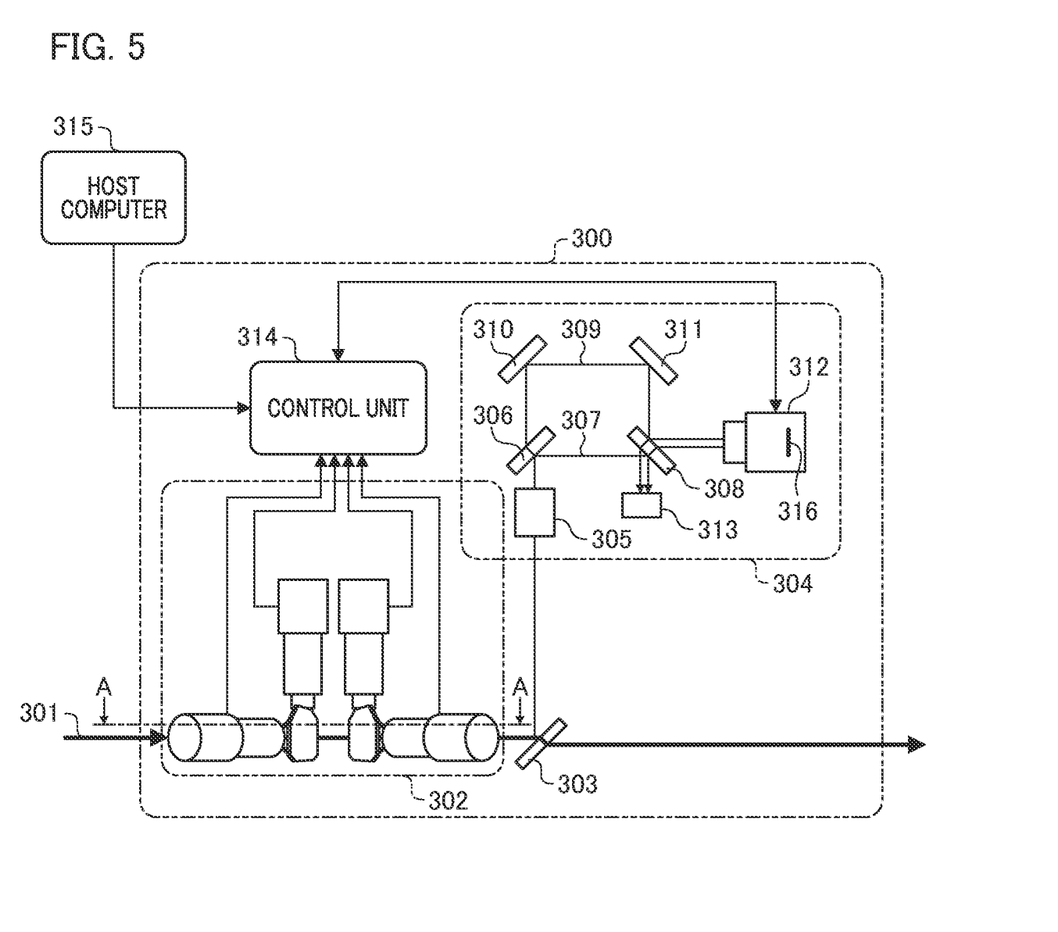
FIG. 5 is a diagram illustrating a configuration example of an optical axis correction unit according to the first embodiment.

FIG. 5 is a diagram illustrating a configuration example of an optical axis correction unit 300 according to the first embodiment. Laser light 301 incident on the optical axis correction unit 300 is incident on an actuator mirror unit 302. The actuator mirror unit 302 is a Galvano scanner comprising a motor and a galvanometer mirror that can adjust the three-axis directions of X, Y, and Z of the laser light 301 and the angle θ, each of which can be adjusted to a desired angle.

Thereafter, the laser light 301 is branched in two directions by a sampler 303 that branches light at a desired ratio. Most of the laser light 301 incident on the optical axis correction unit 300 passes through the sampler 303 and is emitted from the optical axis correction unit 300, and a portion thereof is reflected by the sampler 303 and is sent out to a measurement unit 304. The sampler 303 in the first embodiment transmits 99.9% of the laser light 301 incident on the optical axis correction unit 300. 0.1% of the laser light 301 is reflected by the sampler 303 and is incident on the measurement unit 304.

A portion of the laser light 301 incident on the measurement unit 304 passes through a variable magnification optical system 305. The variable magnification optical system 305 in the first embodiment is set to a magnification of 0.7 by a plurality of lenses. Thereby, the beam diameter after passing through the variable magnification optical system 305 is reduced to 7/10 of that before passing through it. In addition, the angle component of the emitted laser light changes by a factor of 10/7 and the position component thereof changes by a factor of 7/10 with respect to the fluctuation of the incident laser light.

The laser light 301 after passing through the variable magnification optical system 305 is branched in two directions of an optical path A307 and an optical path B309 by a first half mirror 306 that branches light at a desired ratio. A portion of the laser light on the optical path A307 passes through a second half mirror 308 that also branches light at a desired ratio, and is incident on a camera 312. After the laser light on the optical path B309 is reflected by a first mirror 310 and a second mirror 311, a portion thereof is reflected by the second half mirror 308 and is incident on the camera 312.

The second half mirror 308 guides the transmitted light on the optical path A307 and the reflected light on an optical path B308 to different positions on the light receiving surface of a sensor 316 of the camera 312. Both the first half mirror 306 and the second half mirror 308 in the first embodiment transmit 50% of the incident laser light 301 and reflect 50% thereof.

The reflected light on the optical path A307 and the transmitted light on the optical path B309 which are caused by the second half mirror 308 are shielded and absorbed by a light-absorbing damper 313. In the first embodiment, the optical path length of the optical path B309 is set to be approximately 2.5 times longer than the optical path A307.

The camera 312 is provided with one sensor 316, which measures the incidence positions of the two laser light beams from the optical path A307 and the optical path B309 and transmits the measurement result to a control unit 314.

The camera 312 in the first embodiment is a CMOS camera as an example, and performs signal transmission with the control unit 314 through a LAN cable.

In addition to control of the camera 312, the control unit 314 has a fluctuation component calculation function with respect to the measurement result of the camera 312 and an actuator control function, and controls the angle of the actuator mirror. The control unit 314 in the first embodiment includes a PC with camera control and dedicated calculation process software and a driver for a Galvano scanner. In addition to independent operation, the control unit 314 can be remotely operated by a host computer 315 provided outside of the optical axis correction unit 300.

The host computer 315 is an information processing device, and typically a general-purpose computer such as a personal computer is used. That is, the host computer 315 has a built-in CPU serving as a computer, and controls the operation of each unit of the entire device on the basis of a computer program stored in a memory serving as a storage medium. The host computer 315 is connected to the optical axis correction unit 300, for example, through a network, and can perform control thereof.

Partially transmissive optical elements such as samplers and half mirrors may provide a wedge angle on the optical surface as necessary. In the first embodiment, a wedge angle of 1° is set to suppress a ghost light component from the transmission surface.

Figure 6A:
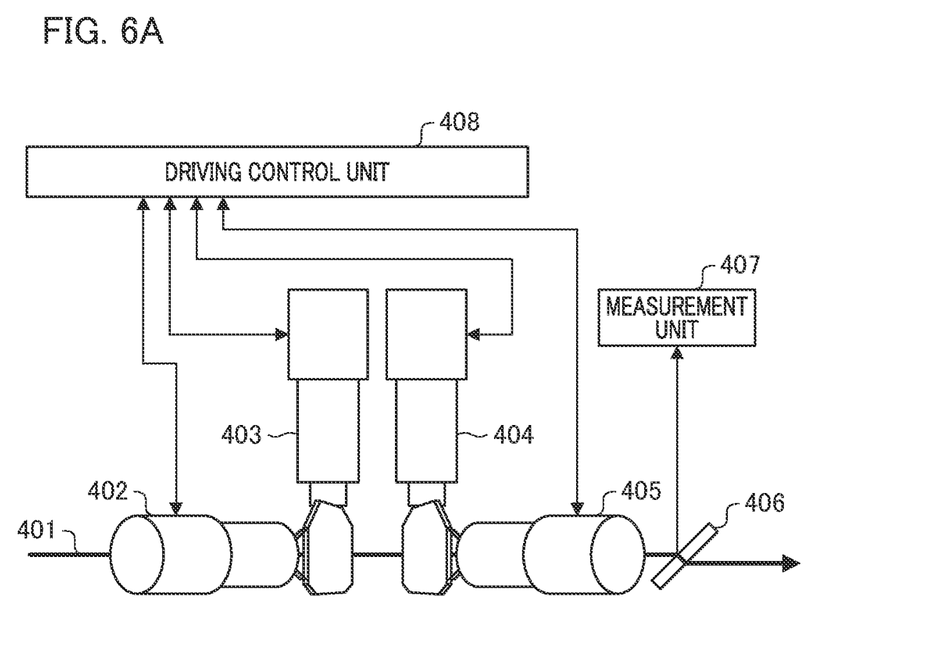
FIGS. 6A and 6B are diagrams illustrating the arrangement of four pairs of Galvano scanners constituting an actuator mirror unit.
Figure 6B:
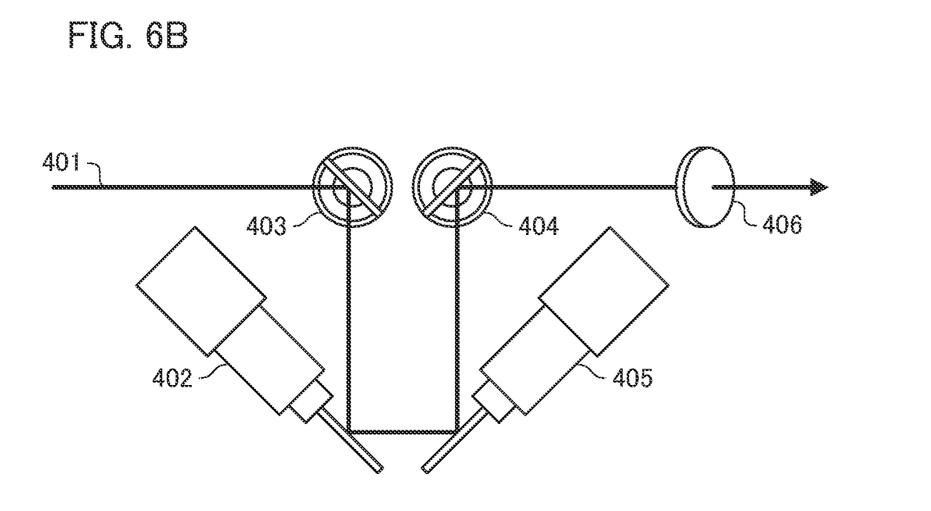

FIGS. 6A and 6B are diagrams illustrating the arrangement of four pairs of Galvano scanners constituting the actuator mirror unit 302. FIG. 6A is a layout diagram illustrating a Galvano scanner from the same direction as FIG. 5, and FIG. 6B is a layout diagram illustrating a Galvano scanner from the A-A cross-sectional direction of FIG. 5.

Laser light 401 incident on the actuator mirror unit 302 is reflected by a first Galvano scanner 402, a second Galvano scanner 403, a third Galvano scanner 404, and a fourth Galvano scanner 405, and is incident on a sampler 406. Transmitted light of the sampler 406 is emitted from the optical axis correction unit 300, and reflected light is sent out to a measurement unit 407.

A dielectric multilayer film mirror having a reflectance of 99.95% with respect to the laser wavelength was used as the mirror of each Galvano scanner in the first embodiment. A motor angle is detected by an encoder provided inside the Galvano scanner. Each Galvano scanner is connected to a driving control unit 408.

The driving control unit 408 uses an encoder signal of the Galvano scanner to send out a motor driving signal so that the mirror is at a desired angle, and controls the Galvano scanner. Although the driving control unit 408 is a separate unit from the control unit 314 in the first embodiment, the control unit 314 may execute the function of the driving control unit 408.

A calculation process for optical axis fluctuation of the laser light in the first embodiment is the same as the series of steps shown in FIG. 4. Although a unit configured to correct optical axis fluctuation in the first embodiment is also the same as in FIG. 2, the calculation process and optical axis correction operation of the control unit 314 will be described below in more detail.

Figure 7:
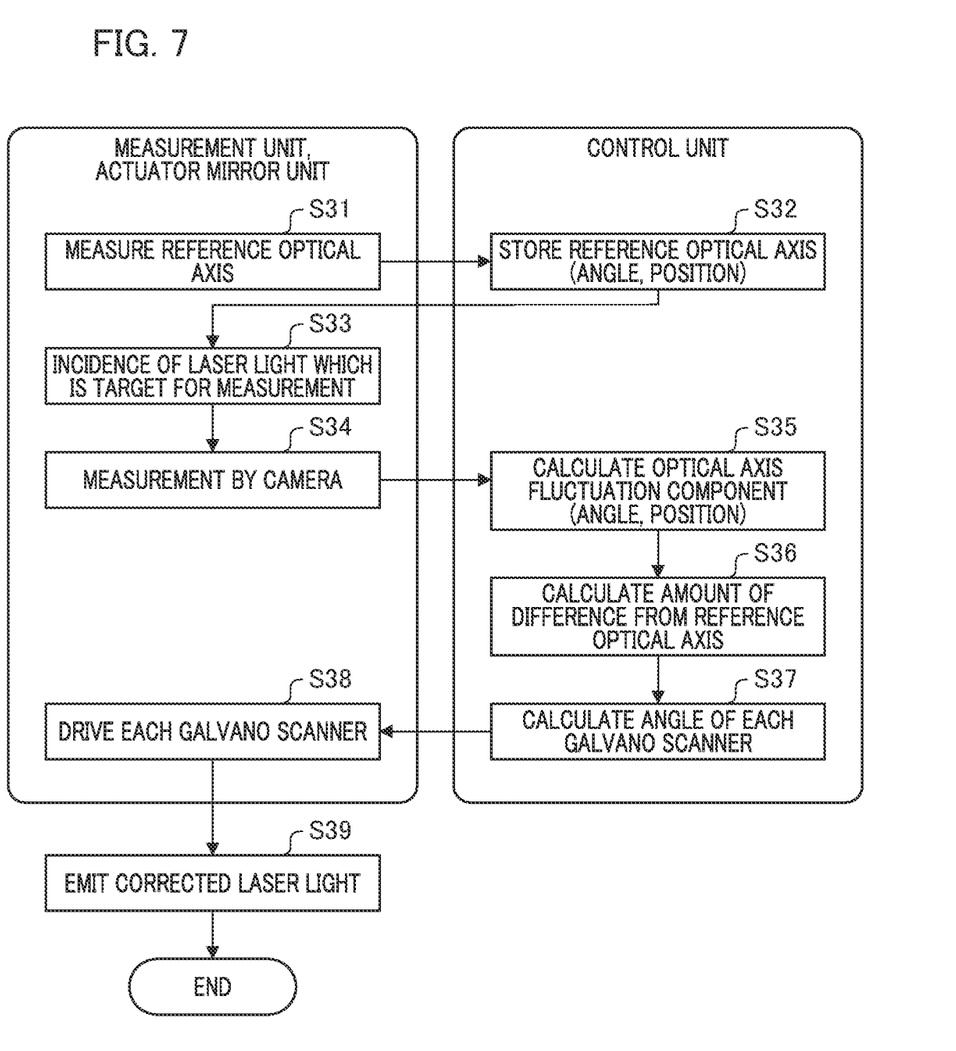
FIG. 7 is a flow diagram of an optical axis correction process according to the first embodiment.

FIG. 7 is a flow diagram of an optical axis correction process according to the first embodiment. In the first embodiment, an example in which the actuator mirror is constantly driven to perform correction in accordance with the fluctuation of incident laser light (laser light which is a target for measurement) will be described.

In step S31, the measurement unit 304 first measures the incidence position of the reference laser light. In step S32, the control unit 314 stores the incidence position (reference position) of the reference laser light measured by the measurement unit 304. Specifically, as the reference position, the incidence position and incidence angle of the reference laser light on the sensor 316 are stored. Meanwhile, steps S31 and S32 are equivalent to step S1 in FIG. 2.

In step S33, the laser light which is a target for measurement is incident on the measurement unit 304. In step S34, the camera 312 of the measurement unit 304 measures the incidence position of the laser light which is a target for measurement on the sensor 316. Here, as an example, the camera 312 is assumed to measure the optical axis angle and position of the laser light at regular intervals, and to transmit the measurement result to the control unit 314. Meanwhile, step S34 is equivalent to step S2 in FIG. 2.

In step S35, the control unit 314 calculates the deviation from the reference position from the measured incidence position of the laser light which is a target for measurement. In step S36, the control unit 314 calculates the amount of difference in the angle and position of the laser light which is a target for measurement with respect to the reference optical axis for each measurement result. Meanwhile, steps S35 and S36 are equivalent to step S3 in FIG. 2.

In step S37, the angle of each Galvano scanner for eliminating the amount of difference from the reference optical axis is calculated through software processing of the control unit 314. The control unit 314 then transmits the calculated angle to the driving control unit 408.

In step S38, the driving control unit 408 drives each Galvano scanner at an angle acquired from the control unit 314, and corrects the fluctuation of the laser light incident on the optical axis correction unit 300. Meanwhile, steps S37 and S38 are equivalent to step S4 of FIG. 2.

In step S39, the laser light in which the fluctuation has been corrected is then emitted from the optical axis correction unit 300.

With such a configuration, the actuator mirror can be constantly driven to perform correction in accordance with the fluctuation of the incident laser light, and the stability of the laser light emitted from the optical axis correction unit 300 is improved.

Meanwhile, in the first embodiment, a portion of the laser light incident on the optical axis correction unit 300 is caused to be incident on the measurement unit 304, and thus the optical axis position is measured and the optical axis fluctuation component is calculated in parallel with processing of the processing target. However, by causing all of the laser light incident on the optical axis correction unit 300 to be incident on the measurement unit 304, the correction process for optical axis fluctuation may be performed at a timing different from the processing of the processing target.

Second Embodiment

Figure 8:
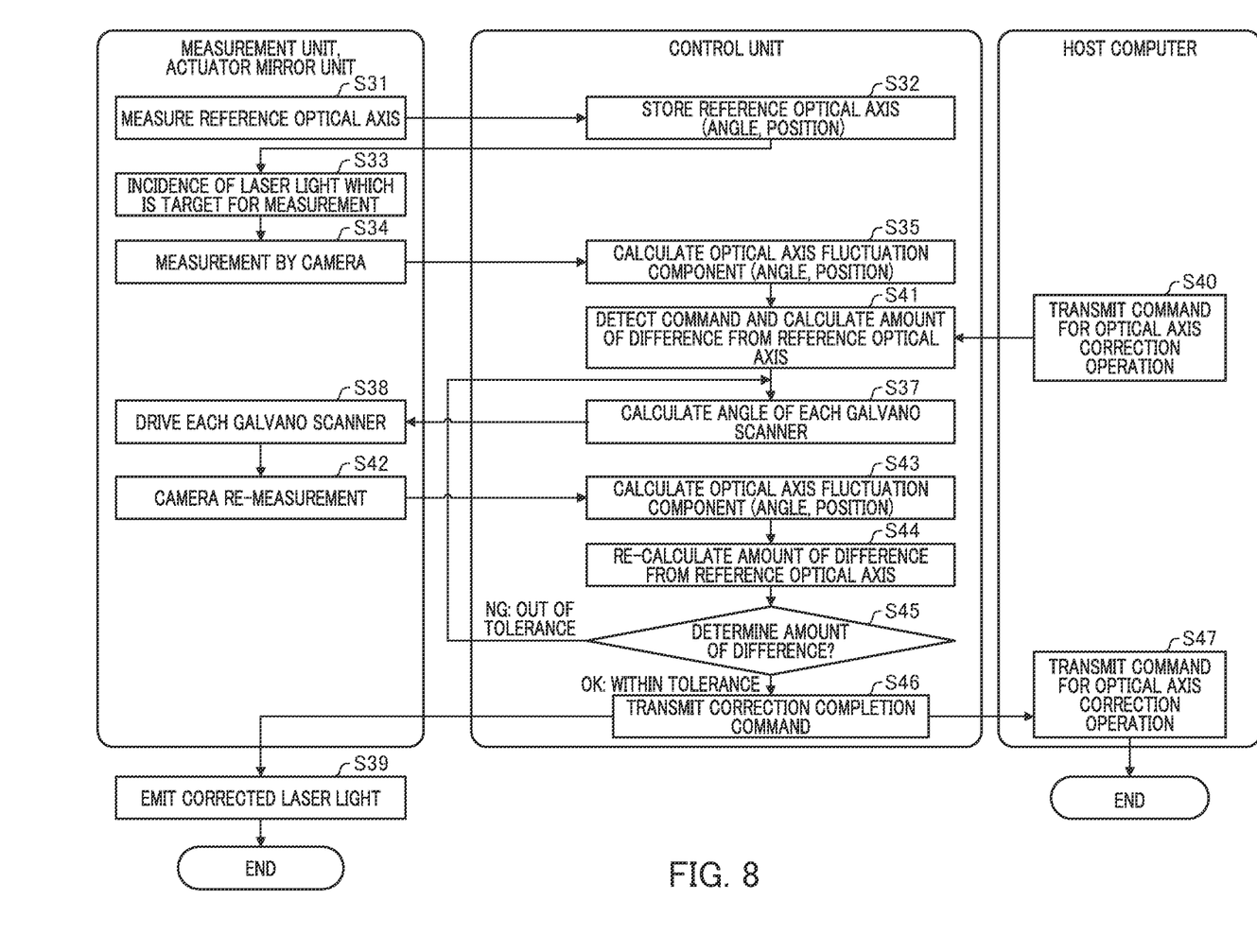
FIG. 8 is a flow diagram of an optical axis correction process according to a second embodiment.

FIG. 8 is a flow diagram of an optical axis correction process according to a second embodiment. In the second embodiment, a correction flow for driving the actuator mirror at a timing designated by a user to perform correction for the fluctuation of the incident laser light will be described.

In the present flow, the same steps as those in FIG. 7 of the first embodiment are assigned the same step numbers, and description thereof will be omitted. Meanwhile, in the second embodiment, the camera 312 is also assumed to measure the optical axis angle and position of the laser light at regular intervals, and to transmit the measurement result to the control unit 314 serving as a control unit.

In step S40, a command for optical axis correction operation is transmitted from the host computer 315. In step S41, the control unit 314 detects the command transmitted from the host computer 315, and the control unit 314 calculates the amount of difference in the angle and position of the laser light which is a target for measurement with respect to the reference optical axis for each measurement result. In step S37, the angle of each Galvano scanner for eliminating the amount of difference from the reference optical axis is calculated through software processing of the control unit 314. The control unit 314 then transmits the calculated angle to the driving control unit 408.

In step S38, the driving control unit 408 drives each Galvano scanner at an angle acquired from the control unit 314, and corrects the fluctuation of the laser light incident on the optical axis correction unit 300. In step S42, the camera 312 of the measurement unit 304 measures the incidence position of the corrected laser light on the sensor 316.

In step S43, the control unit 314 calculates the deviation from the reference position from the measured incidence position of the corrected laser light. In step S44, the control unit 314 calculates the amount of difference in the angle and position of the corrected laser light with respect to the reference optical axis for each measurement result. In step S45, the control unit 314 determines whether the amount of difference is within a tolerance (threshold) set in advance.

In step S45, if the amount of difference is not within the tolerance (equal to or less than the threshold) (No), the correction operation for correcting the amount of difference is executed again. Specifically, steps S37 to S45 are repeated until the amount of difference is within the tolerance. On the other hand, in step S45, if the amount of difference is equal to or less than the threshold (Yes), the correction operation is completed, and the control unit 314 transmits a correction completion command to the host computer 315 in step S46 to end the correction operation. Meanwhile, steps S42 to S45 are equivalent to steps S5 and S6 in FIG. 2.

In the second embodiment, as the tolerance after optical axis correction, an angle of 0.01° and a position of 0.1 mm were set. Meanwhile, it is also possible to cancel the repetition of the correction operation by setting the control unit 314. In addition, if a dark noise component of the CMOS camera influences or the intensity of the incident laser light changes, image processing such as providing a detection threshold may be performed on the camera side as necessary.

In addition, if the incident laser light contains a noise component such as vibration or atmospheric fluctuation, noise reduction means such as an averaging process may be provided on the camera side as necessary. In addition, in order to cope with the characteristics of laser to be used, an optical system such as a beam expander, a polarization control element, or an optical element such as a light attenuation filter may be added before, after, or inside the optical axis correction unit as necessary.

According to the second embodiment, since it is possible to perform the optical axis correction process at a user's desired timing, for example, the correction process does not reduce the productivity of processing, which is advantageous in terms of the improvement of productivity.

Third Embodiment

Figure 9:
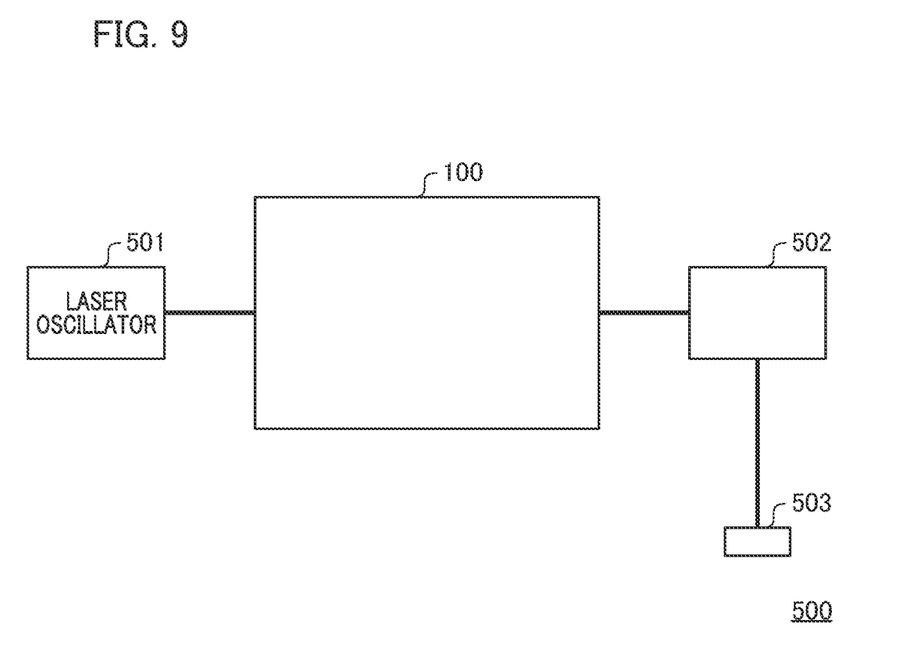
FIG. 9 is a diagram illustrating a configuration example of a laser processing device according to a third embodiment.

Hereinafter, an example of a processing device 500 including an optical element that guides light emitted from the optical axis correction unit 100 shown in the first embodiment to a target will be described. Meanwhile, the optical axis correction unit 300 may be applied. FIG. 9 is a diagram illustrating a configuration example of a laser processing device 500 according to a third embodiment.

The laser processing device 500 in the third embodiment includes the optical axis correction unit 100 shown in the first embodiment at the subsequent stage of a laser oscillator 501 serving as a laser light source. A condensing optical system 502 is disposed at the subsequent stage, and a laser light beam is condensed and radiated onto a processing target 503 dispose on the focal plane.

In this configuration, by driving the first actuator mirror 104 and the second actuator mirror 105 of the optical axis correction unit 100, scanning with the laser light is performed and the processing target 503 can be processed.

In the processing device 500, it is preferable that driving of the actuator mirror for correcting the optical axis fluctuation of the laser light is executed at a different timing from the processing step for the processing target 503. In other words, it is preferable that driving of the actuator mirror for correcting the optical axis fluctuation is executed at a different timing from a period in which the processing target 503 is being processed by the laser light. By driving the actuator mirror for correcting the optical axis fluctuation at such a timing, it is possible to reduce the influence of the driving on the processing.

In addition, it is preferable that the detection of the laser optical axis position for correcting the optical axis fluctuation of the laser light is executed at the same timing as the processing step for the processing target 503. Setting such a timing makes it possible to efficiently perform the correction process, which is advantageous in terms of the improvement of productivity.

Embodiment Relating to Method of Manufacturing Article

The processing device according to the embodiments described above can be used in a method of manufacturing an article. The method of manufacturing the article can include a step of processing an object (target) using the processing device and a step of processing an object that has been processed in the step.

The processing can include, for example, at least any one of processing different from the processing, transportation, inspection, sorting, assembly, and packaging. The article manufacturing method of first to third embodiments is advantageous in at least one of the performance, quality, productivity, and production cost of an article compared with methods of the related art.

Other Embodiments

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. For example, the sampler 106, the measurement unit 200, the control unit 113, and the like may be combined and made independent to form one optical axis detection device that calculates the fluctuation component of the optical axis.

In addition, as a part or the whole of the control according to the embodiments, a computer program realizing the function of the embodiments described above may be supplied to the detection apparatus or the like through a network or various storage media. Then, a computer (or a CPU, an MPU, or the like) of the detection apparatus or the like may be configured to read and execute the program. In such a case, the program and the storage medium storing the program configure the present invention.

This application claims the benefit of Japanese Patent Application No. 2021-178766 filed on Nov. 1, 2021, which is hereby incorporated by reference herein in its entirety.

What is claimed is:

1. A detection device comprising:
a sample mirror of splitting laser light output from a light source into plural first light beams;
a first split unit of splitting one of the first light beams into plural second light beams;
a detection unit of guiding detecting a position of each of the plural second light beams;
a light guide unit of guiding the second light beams to the detection unit with optical path lengths different from each other, wherein the optical path lengths are distances from the light source to the detection unit; and
an acquiring unit acquiring an angular deviation or a positional deviation of another first light beam on the basis of a difference in the position of each of the plural second light beams detected by the detection unit,
wherein the detection unit is one sensor that detects the position of each of the plural second light beams guided by the light guide unit.

2. The detection device according to claim 1, wherein the acquiring unit calculates an angular deviation and a positional deviation of the laser light on the basis of the difference in the position of each of the plural second light beams detected by the detection unit.

3. The detection device according to claim 1, wherein the light guide unit includes
an optical member configured to make optical path lengths of the plural second light beams different from each other, and
a second split unit configured to further split each of the plural second light beams into plural third light beams guided with the different optical path lengths and guide the plural third light beams to different positions on a light receiving surface of the sensor.

4. The detection device according to claim 1, wherein the sensor includes a CCD sensor or a CMOS sensor.

5. A correction device configured to correct an incidence angle or an incidence position of laser light output from a light source on a target, comprising a detection device, wherein the detection device includes:
a sample mirror of splitting laser light output from a light source into plural first light beams;
a first split unit of splitting one of the first light beams into plural second light beams;
a detection unit of detecting a position of each of the plural second light beams;
a light guide unit of guiding the second light beams to the detection unit with optical path lengths different from each other, wherein the optical path lengths are distances from the light source to the detection unit; and
an acquiring unit acquiring an angular deviation or a positional deviation of another first light beam on the basis of a difference in the position of each of the plural second light beams detected by the detection unit,
wherein the detection unit is one sensor that detects the position of each of the plural second light beams guided by the light guide unit, a driving unit of driving a position or angle of the sample mirror and adjusting an incident angle or an incidence position of the another first light beam to the target by adjusting a position or angle of the sample mirror based on the acquired angular deviation or the acquired position deviation of the acquiring unit.

6. The correction device according to claim 5, wherein the acquiring unit detects a command for executing the correction, and performs the correction if the command is detected.

7. The correction device according to claim 5, wherein the sample mirror includes a galvanometer mirror.

8. The correction device according to claim 5, wherein three-axis directions and an angle of the laser light are adjusted by adjusting the position or angle of the sample mirror.

9. A processing device configured to process an object, comprising:
- a correction device configured to correct an incidence angle or an incidence position of laser light output from a light source on a target; and
- a detection device,
- wherein the detection device includes
- a sample mirror of splitting laser light output from a light source into plural first light beams,
- a first split unit of splitting one of the first light beams into plural second light beams,
- a detection unit of detecting a position of each of the plural second light beams,
- a light guide unit of guiding the second light beams to the detection unit with optical path lengths different from each other, wherein the optical path lengths are distances from the light source to the detection unit, and
- an acquiring unit acquiring an angular deviation or a positional deviation of another first light beam on the basis of a difference in the position of each of the plural second light beams detected by the detection unit,
- wherein the detection unit is one sensor that detects the position of each of the plural second light beams guided by the light guide unit,
- a driving unit of driving a position or angle of the sample mirror and adjusting an incident angle or an incidence position of the another first light beam to the target by adjusting a position or angle of the sample mirror based on the acquired angular deviation or the acquired position deviation of the acquiring unit, and
- wherein the processing device further comprises an optical element configured to guide light emitted from the correction device to the object.

10. The processing device according to claim 9, wherein the acquiring unit causes correction performed by the correction device to be performed at a different timing from the processing of the object.

11. The processing device according to claim 9, wherein the acquiring unit causes the correction device to detect the laser light at the same timing as the processing of the object.

12. An article manufacturing method of manufacturing an article by processing an object using a processing device configured to process an object,
- wherein the processing device includes a correction device configured to correct an incidence angle or an incidence position of laser light output from a light source on a target and a detection device,
- the detection device includes
- a sample mirror of splitting laser light output from a light source into plural first light beams,
- a first split unit of splitting one of the first light beams into plural second light beams,
- a detection unit of detecting a position of each of the plurality of the plural second light beams,
- a light guide unit of guiding the second light beams to the detection unit with optical path lengths different from each other, wherein the optical path lengths are distances from the light source to the detection unit, and
- an acquiring unit acquiring an angular deviation or a positional deviation of another first light beam on the basis of a difference in the position of each of the plural second light beams detected by the detection unit,
- wherein the detection unit is one sensor that detects the position of each of the plural second light beams guided by the light guide unit,
- a driving unit of driving a position or angle of the sample mirror and adjusting an incident angle or an incidence position of the another first light beam to the target by adjusting a position or angle of the sample mirror based on the acquired angular deviation or the acquired position deviation of the acquiring unit,
- wherein the processing device includes an optical element configured to guide light emitted from the correction device to the object, and
- the article manufacturing method comprises processing an object using the processing device and obtaining an article from the processed object.

* * * * *